United States Patent
Zimmanck

(10) Patent No.: US 11,979,023 B2
(45) Date of Patent: May 7, 2024

(54) METHOD AND APPARATUS FOR RELATIVE VALUE GENERATION OF RESOURCES BASED ON KNAPSACK ALGORITHMS

(71) Applicant: Enphase Energy, Inc., Petaluma, CA (US)

(72) Inventor: Donald Richard Zimmanck, Sebastopol, CA (US)

(73) Assignee: Enphase Energy, Inc., Petaluma, CA (US)

(*) Notice: Subject to any disclaimer, the term of this patent is extended or adjusted under 35 U.S.C. 154(b) by 140 days.

(21) Appl. No.: 17/160,663

(22) Filed: Jan. 28, 2021

(65) Prior Publication Data

US 2021/0232167 A1 Jul. 29, 2021

Related U.S. Application Data

(60) Provisional application No. 62/966,810, filed on Jan. 28, 2020.

(51) Int. Cl.
*H02J 3/14* (2006.01)
*G05F 1/66* (2006.01)
*H02J 1/14* (2006.01)

(52) U.S. Cl.
CPC ............ *H02J 3/14* (2013.01); *G05F 1/66* (2013.01); *H02J 1/14* (2013.01)

(58) Field of Classification Search
CPC ... G05B 15/02; G05B 2219/2639; H02J 1/14; H02J 3/005; H02J 3/007; H02J 3/0075;
(Continued)

(56) References Cited

U.S. PATENT DOCUMENTS 6,921,987 B2 * 7/2005 Marin-Martinod ........................ B64D 11/0624
307/29
7,119,457 B1 * 10/2006 Flegel ....................... H02J 3/14
307/64
(Continued)

FOREIGN PATENT DOCUMENTS

WO     WO-2005055389 A1 *    6/2005    ................ H02J 3/14

OTHER PUBLICATIONS

Choi S., Park S., Kim HM. "The Application of the 0-1 Knapsack Problem to the Load-Shedding Problem in Microgrid Operation.", (2011), In: Kim T., Adeli H., Stoica A., Kang BH. (eds) Control and Automation, and Energy System Engineering. CES3 2011, CA 2011. Communications in Computer and Information Science, vol. 256. Springer, Berlin, Heidelberg https://link.springer.com/chapter/10.1007/978-3-642-26010-0_28.
(Continued)

*Primary Examiner* — Crystal J Barnes-Bullock
(74) *Attorney, Agent, or Firm* — Moser Taboada

(57) ABSTRACT

Method and apparatus for determining relative value of loads. In one embodiment the method comprises determining, for a load in a plurality of loads where (i) each load in the plurality has a weight and a value associated with it and (ii) the plurality is operating according to a primary solution where a net weight of all loads with an activated state satisfies a primary threshold, a change in operating state; determining a secondary solution for a subset of loads not including the load having the change, such that a net weight of all loads in the subset with an activated state satisfies a secondary threshold based on the primary threshold; and determining, based on the values of loads in the subset that have operating states in the secondary solution different
(Continued)

from their operating states in the primary solution, an updated value for the load having the change.

20 Claims, 3 Drawing Sheets

(58) Field of Classification Search
CPC ........ H02J 3/06; H02J 3/12; H02J 3/14; H02J 3/144; H02J 3/16; G05F 1/66
See application file for complete search history.

(56) References Cited

U.S. PATENT DOCUMENTS

| | | | | |
|---|---|---|---|---|
| 8,761,950 | B2 * | 6/2014 | Kouda | H02J 13/00022 |
| | | | | 219/486 |
| 8,887,172 | B2 * | 11/2014 | Bernardi | G06F 9/5077 |
| | | | | 718/1 |
| 9,065,729 | B2 * | 6/2015 | Shaw | H04L 41/5025 |
| 9,405,591 | B2 * | 8/2016 | Bhanage | G06F 9/5083 |
| 9,825,469 | B2 * | 11/2017 | Yokoyama | H02J 4/00 |
| 9,927,824 | B2 * | 3/2018 | Nakakita | H02J 3/14 |
| 9,983,645 | B2 * | 5/2018 | Boss | H02J 3/14 |
| 10,243,396 | B2 | 3/2019 | Inoue | |
| 10,333,304 | B2 * | 6/2019 | Borean | H04L 67/125 |
| 10,667,082 | B2 * | 5/2020 | Zhang | G06F 16/2246 |
| 10,667,083 | B1 * | 5/2020 | Zhang | G06F 16/29 |
| 10,734,809 | B2 * | 8/2020 | Saroya | G06Q 50/06 |
| 10,971,949 | B2 * | 4/2021 | Carr | H02J 13/0013 |
| 11,079,833 | B2 * | 8/2021 | Ail | G06F 1/3209 |
| 11,283,262 | B2 * | 3/2022 | Arslan | H02J 3/008 |
| 2011/0270456 | A1 | 11/2011 | Kouda et al. | |
| 2012/0245794 | A1 * | 9/2012 | Aragai | H02J 1/14 |
| | | | | 701/36 |
| 2014/0084682 | A1 | 3/2014 | Boys et al. | |
| 2014/0371942 | A1 * | 12/2014 | Matsuyama | H02J 13/0006 |
| | | | | 700/297 |
| 2015/0005978 | A1 | 1/2015 | Nakakita et al. | |
| 2015/0338869 | A1 * | 11/2015 | Behrangrad | G05B 15/02 |
| | | | | 700/291 |
| 2016/0104066 | A1 * | 4/2016 | Deubzer | G06N 3/00 |
| | | | | 706/13 |
| 2016/0370817 | A1 * | 12/2016 | Kawai | H02J 3/14 |
| 2017/0090545 | A1 * | 3/2017 | Wang | G06F 1/3206 |
| 2017/0253139 | A1 * | 9/2017 | North | B60L 53/63 |
| 2017/0346292 | A1 | 11/2017 | Binder et al. | |
| 2019/0044332 | A1 * | 2/2019 | Saroya | H02J 13/00007 |
| 2020/0083712 | A1 * | 3/2020 | Arslan | H02J 3/38 |
| 2020/0335971 | A1 * | 10/2020 | Saroya | H02J 3/28 |
| 2020/0387804 | A1 * | 12/2020 | Mathur | G06N 5/046 |
| 2021/0124385 | A1 * | 4/2021 | Zimmanck | H02J 3/32 |
| 2022/0214655 | A1 * | 7/2022 | Hua | H02J 3/003 |

OTHER PUBLICATIONS

Leonardo Trigueiro Dos Santos et al., "Optimized Load Shedding Approach for Grid-Connected DC Microgrid Systems under Realistic Constraints. MDPI, buildings", vol. 6, Issue 4, Dec. 9, 2016, pp. 1-14.
Siddarth Sankar M J et al., "Modified 0-1 Knapsack Problem for Demand Side Management", International Journal of Innovative Technology and Exploring Engineering (IJITEE), ISSN: 2278-3075, vol. 8, Issue 6S4, Apr. 2019, pp. 1-4.
International Search Report and written opinion, dated May 18, 2021, International Application No. PCT/US2021/015394.
European Search Report for EP 21 74 7457 dated Mar. 7, 2024.

* cited by examiner

METHOD AND APPARATUS FOR RELATIVE VALUE GENERATION OF RESOURCES BASED ON KNAPSACK ALGORITHMS

CROSS-REFERENCE TO RELATED APPLICATIONS

This application claims benefit of U.S. provisional patent application Ser. No. 62/966,810, entitled "Relative Value Generation of Resources Based on Knapsack Algorithms" and filed Jan. 28, 2020, which is herein incorporated in its entirety by reference.

BACKGROUND OF THE INVENTION

Field of the Invention

Embodiments of the present disclosure relate generally to load control and, more particularly, to a value-based load control technique.

Description of the Related Art

A typical approach to implementing load control is called a priority system, where electric loads (or resources) are ranked as a list from highest priority to lowest priority. If energy use must be reduced, loads are incrementally shed starting with the lowest priority and moving up the list. One problem with this approach is that it does not consider the relative value of each load to each other and the fact that loads consume different amounts of energy. For example, if the highest priority load consumes more energy than the remaining loads combined, then counterintuitively it may make sense to turn that load off first if the sum of the values of all the other loads is higher than the highest priority load.

Another approach for load control is to give each load a relative value and to use a "knapsack" solver to calculate what loads should be ON to maximize the total value given a certain energy budget—i.e., the problem is to choose a subset of the items, each having a weight and a value, to arrive at a maximum total value that will fit into a limited-sized container. In the case of load control, the weight of each load may be the energy it uses (for example, averaged over a specific time period), the value is the relative value of the load, and the limit is the amount of energy available (for example, forecasted over a time period), which may be based on power system conditions and a forecast of future load use. One problem with the knapsack approach is that generally system users (e.g., homeowners, office managers) are not able to effectively quantify relative values of the loads.

Therefore, there is a need in the art for efficiently determining relative values of loads.

SUMMARY OF THE INVENTION

Embodiments of the present invention generally relate to determining relative value of loads as shown in and/or described in connection with at least one of the figures.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to a method and apparatus for determining relative load values, employed in value-based load control, using an iterative algorithm (e.g., a secondary knapsack solver) for determining the relative value of a load. The technique described herein enables a load control system to learn, in an intuitive manner, relative load values based on simple ON/OFF user interactions, and provides a simple method for configuring load values without complicating the system's user interface.

In various embodiments, load values are inferred from use of the loads; every time the state of a load is changed by a user, for example when the user turns a load from ON to OFF, that information is used to update load values iteratively so that over time they converge to what the true value of the load is. By overriding the decision made by an automatic load controller, the user indicates to the system that the relative value of the load at that moment in time is incorrect. For example, when the user turns a load from OFF to ON, it indicates to the system that the load value at that time is too low. Similarly, when the user turns a load from ON to OFF, it indicates to the system that the load value at that time is too high. This user-provided feedback is utilized to dynamically update the relative values of the loads such that the knapsack solver would have derived the correct ON/OFF state of the load that the user just changed.

These new values (which may also be referred to as "scores") can be determined by creating a secondary knapsack with the item (i.e., load) changed by the user removed from the controllable items. After this secondary knapsack is solved, the updated value of the user-changed load can be derived by summing the net value change in the solution and adding or subtracting a small number (e.g., 1) to make the solution unique.

Figure 1:
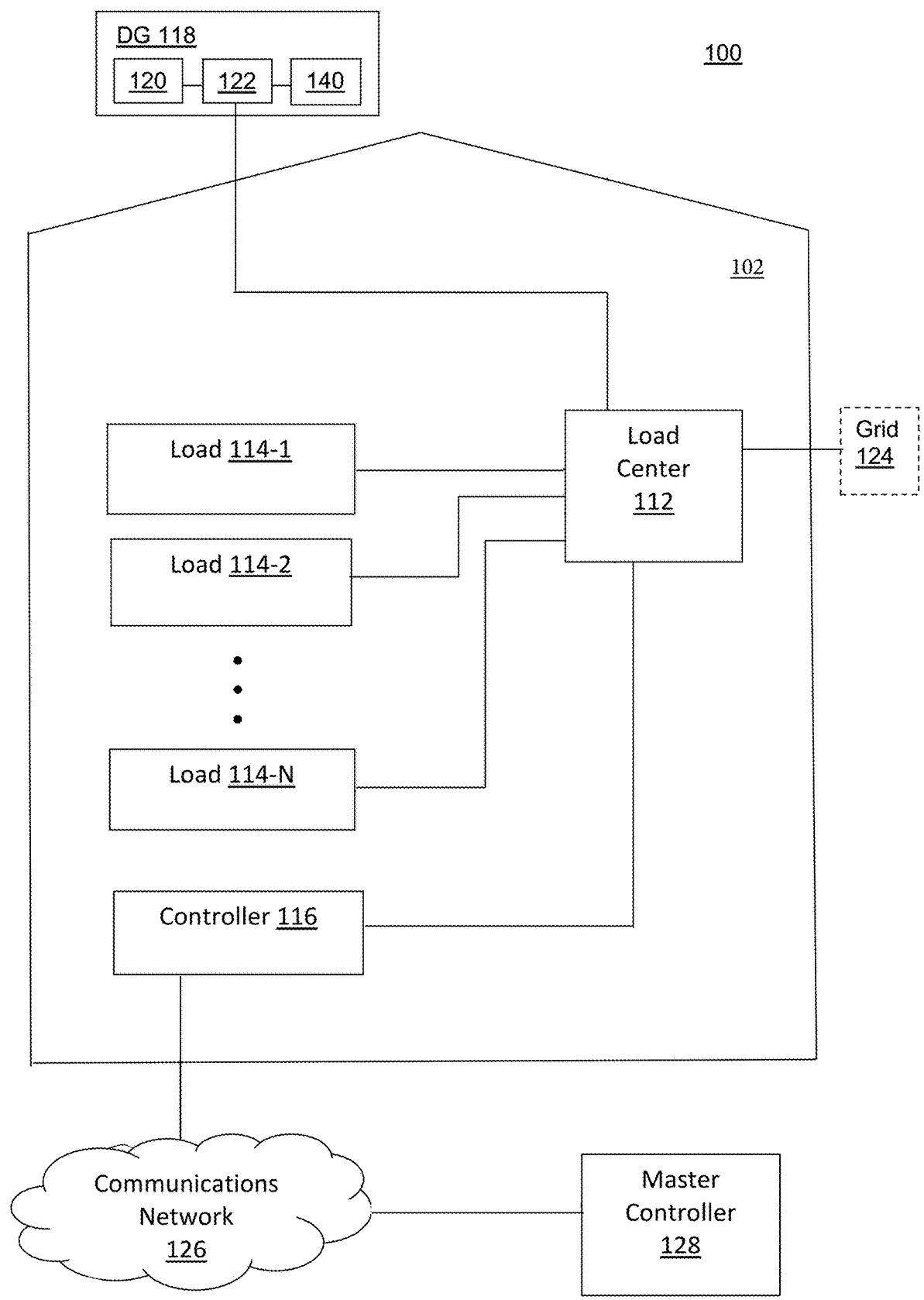
FIG. 1 is a flow diagram of a load control technique in accordance with one or more embodiments of the present invention.

FIG. 1 is a block diagram of a system 100 for power generation and distribution in accordance with one or more embodiments of the present invention. This diagram only portrays one variation of the myriad of possible system configurations. The present invention can function in a variety of environments and systems.

The system 100 comprises a building 102, such as a residential or commercial building, housing a plurality of loads 114-1, 114-2, . . . , 114-N (collectively referred to as loads 114) and a controller 116. Each of the loads 114 and the controller 116 are coupled to a distributed generator (DG) 118 and a power grid 124 (e.g., a commercial grid, a microgrid, a local distribution grid, and the like) via a load center 112. Although the loads 114 and the load center 112 are depicted in FIG. 1 as within the building 102, one or more of these may be located outside of the building 102.

The controller 116 is communicatively coupled to a communications network 126 (e.g., the Internet) and may be communicatively coupled, via the communications network 126, to one or more devices, such as a master controller 128 (which may be cloud-based). The controller 116 may communicate information to and/or receive information from the master control 128 (such as performance data, control instructions, and the like). The controller 116 may be coupled to the communications network 126 by any suitable wired and/or wireless technique; in some embodiments, the controller 116 may be wirelessly coupled to the communications network 126 via a commercially available router.

The DG 118 comprises a plurality of power conditioners 122, a plurality of renewable resources (RESs) 120, and a plurality of energy storage/delivery devices 140. A first set of the power conditioners 122 are coupled to the RESs 120 (e.g., one RES 120 to one power conditioner 122) while the remaining power conditioners 122 are coupled to the storage/delivery devices 140 (e.g., one storage/delivery device 140 to one power conditioner 122). The RESs 120 may be any suitable renewable energy source that generates DC from a renewable form of energy, such as wind, solar, hydro, and the like; in one or more embodiments, the RESs 120 are photovoltaic (PV) modules. The energy storage/delivery devices 140 may be any suitable device capable of receiving DC for storage and delivering the stored energy as DC to the corresponding power conditioners 122. The power conditioners 122 are DC-AC inverters that convert the DC from the RESs 120 and/or the storage/delivery devices 140 to commercial-grid compliant AC which is coupled to the load center 112, where it may then be coupled to one or more appliances 114 and/or to the grid 124. Additionally, those power conditioners 122 coupled to the energy storage/delivery devices 140 converter AC from the load center 112 and/or one or more power conditioners couples to RESs 120, to DC for storage in the corresponding energy storage/delivery devices 140. In some alternative embodiments, the power conditioners 122 are DC-DC converters or AC-AC converters.

In one or more embodiments the DG 118 may operate as a microgrid when the load center 112 is not coupled to the grid 124 (e.g., when the grid 124 experiences an outage, or if the grid 124 is never coupled to the load center 112).

The controller 116 is coupled to the load center 112 for communicating with the power conditioners 122 using power line communications (PLC), although additional or alternative types of wired and/or wireless communication techniques may be used. The controller 116 may provide operative control of the DG 118 and/or receive data or information from the DG 118. For example, the controller 116 may be a gateway that receives data (e.g., alarms, messages, operating data and the like) from the power conditioners 122 and communicates the data and/or other information to a remote device or system, such as the master controller 128. The controller 116 may also send control signals to the power conditioners 122, such as control signals determined by the controller 116 or sent to the controller 116 from the master controller 128.

The controller 116 is further communicatively coupled to the loads 114 for controlling the loads 114 as described herein. The controller 116 may use any suitable wired and/or wireless communications technique for communicating with/controlling the loads 114 (e.g., PLC).

The loads 114 operate in discrete states (e.g., ON or OFF) and consume energy received via the load center 112 (e.g., hot water heaters, refrigerators, HVAC equipment, pumps, room lighting, and the like). Although the loads 114 are depicted in FIG. 1 as within the building 102, one or more of the loads 114 may be located outside of the building 102. The loads 114 may be static loads, dynamic loads, or some combination thereof.

Some of the loads 114 may be intelligent loads (also referred to as "smart loads") that each have a corresponding controller for controlling their operation (e.g., for implementing preset control instructions and/or control instructions received, for example from the controller 116, from a user interface, or another device), obtaining data pertaining to the corresponding load 114 (e.g., performance data, operational data, and the like), communicating data to another device (e.g., the controller 116) or system, and the like. In various embodiments, a user may control the operating states of the loads 114 via a user interface.

In accordance with one or more embodiments of the present invention, the controller 116 (which may be referred to as a resource controller) uses an iterative algorithm to determine updated relative load values for value-based load control as described herein; additionally, the controller 116 may control the operating states of the loads 114 based on the determined relative values. The relative load value determination/value-based load control described herein may be utilized in a hierarchical control framework, such as a three-tier framework of primary, secondary, and tertiary control. In some alternative embodiments, a resource controller other than the controller 116, for example the master controller 128, or another resource controller not pictured, may perform the relative load value determination/value-based load control described herein.

Figure 2:
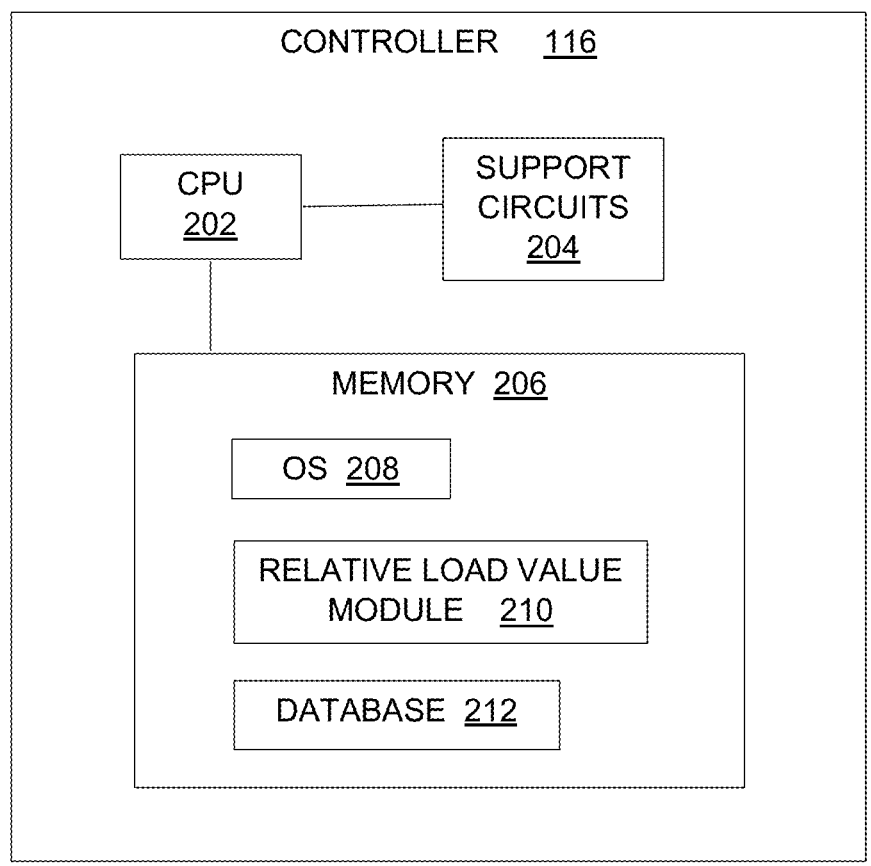
FIG. 2 is a block diagram of a controller in accordance with one or more embodiments of the present invention.

FIG. 2 is a block diagram of a controller 116 in accordance with one or more embodiments of the present invention. The controller 116 comprises support circuits 204 and a memory (or non-transitory computer readable storage medium) 206, each coupled to a central processing unit (CPU) 202. The CPU 202 may comprise one or more conventionally available microprocessors or microcontrollers; alternatively, the CPU 202 may include one or more application specific integrated circuits (ASICs). The support circuits 204 are well known circuits used to promote functionality of the CPU 202. Such circuits include, but are not limited to, a cache, power supplies, clock circuits, buses, input/output (I/O) circuits, transceivers, and the like. The controller 116 may be implemented using a general-purpose computer that, when executing particular software and/or firmware, becomes a specific-purpose computer for performing various embodiments of the present invention. In other embodiments, the CPU 202 may be a microcontroller comprising internal memory for storing controller firmware that, when executed, provides the controller functionality described herein.

The memory 206 may comprise random access memory, read only memory, removable disk memory, flash memory, and various combinations of these and/or other types of memory. The memory 206 is sometimes referred to as main memory and may, in part, be used as cache memory or buffer memory. The memory 206 generally stores the operating system (OS) 208, if necessary, of the controller 116 that can be supported by the CPU capabilities. In some embodiments, the OS 208 may be one of a number of commercially available operating systems such as, but not limited to, LINUX, Real-Time Operating System (RTOS), and the like.

The memory 206 stores various forms of application software and/or firmware, including a relative load value module 210 for determining relative loads values and, in some embodiments, performing value-based load control as described herein. Further detail on the functionality provided by the relative load value module 210 is described below with respect to FIG. 3.

The memory 206 may store additional modules, such as a primary knapsack module for determining primary knapsack solutions described herein for the loads 114. Further, the memory 206 may additionally store a database 212 for storing data, such as data related to the present invention.

The controller 116 may additional comprise a user interface for a user to change operating states of the loads 114.

In some alternative embodiments, a resource controller other than the controller 116 may comprise the relative load value module 210. For example, the master controller 128, having a CPU, support circuits, and memory analogous to those of controller 116, may store the relative load value module 210 for determining the relative load values as described herein, and the master controller 128 may communicate instructions to the controller 116 or other device for controlling the load operating states based on the determined load values.

Figure 3:
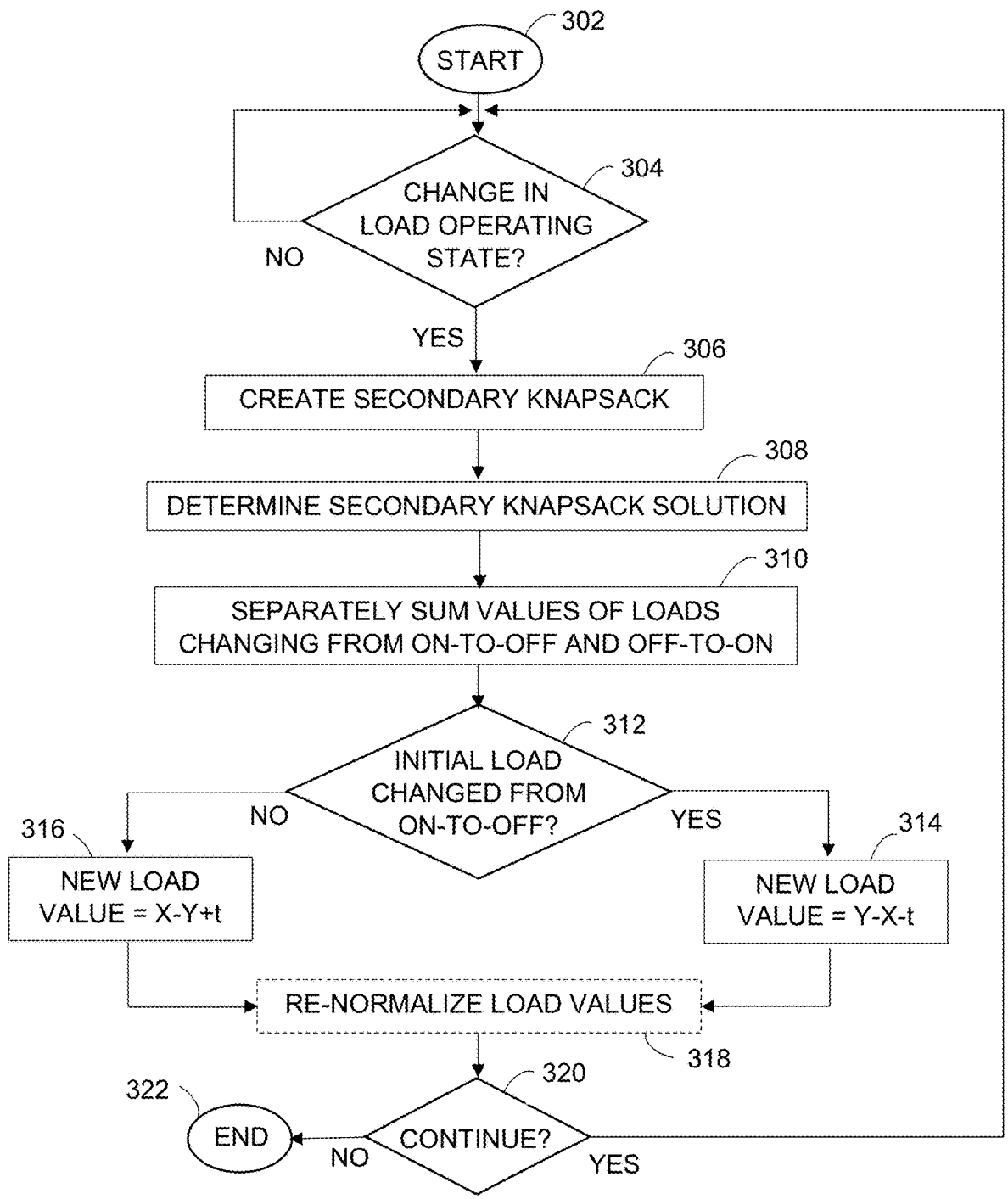
FIG. 3 is a flow diagram of a method for iteratively determining relative load values in accordance with one or more embodiments of the present invention.

FIG. 3 is a flow diagram of a method 300 for iteratively determining relative load values in accordance with one or more embodiments of the present invention. The method 300 iteratively determines updated values for one or more loads when a change to a load's operating state occurs (e.g., as initiated by a user).

In various embodiments, each load in a plurality of loads (such as the loads 114) has an associated weight and value, and the loads are operating (i.e., ON or OFF) based on an optimum solution that maximizes a net value of operating loads while satisfying a weight threshold (e.g., maintaining the net weight of operating loads at or below a weight threshold). This solution, which may be referred to as a primary solution, may be obtained by solving a knapsack problem for the plurality of loads where the knapsack limit is equal to the weight threshold. This knapsack problem, which may be referred to herein as a primary knapsack or primary knapsack problem, may be periodically re-solved for the plurality of loads (for example, when the weight limit ascribed to the primary knapsack changes). In other embodiments, techniques other than knapsack problems may be used in determining which operating states for the loads to satisfy a weight limit.

Although the loads are described herein as having binary operating states (either ON, also referred to as activated, or OFF, also referred to as deactivated), in alternative embodiments one or more of the loads may have more possible operating states.

In various embodiments, a load's weight represents a consumption, such as power or average power consumed by the load over a time period (e.g., determined from historical data), estimated power or estimated average power that the load would consume over a time period, and the like. In certain embodiments, a load's weight may represent a cost associated with the load, such as financial amount for operating the load over a time period. In some embodiments, the weight may be determined based on additional factors, such as actual and/or predicted external conditions associated with the load (e.g., temperature and humidity for air conditioning and heating loads), actual and/or predicted cost for operating the load, and the like. Additionally, in some embodiments the weight may be dynamically determined and updated, for example as weather predictions change, as amount of available power changes, as operating costs change, and the like.

A load's value represents the relative importance or criticality of a load; for example, a refrigerator may have a higher value than a bedroom light. In one or more embodiments, the loads values may be initially assigned equal values, which will tend to prefer lower-energy users as they will have a higher marginal value (value/weight) and thus maximize the number of loads that are ON. In other embodiments, the load values may be initialized to the correspond load's weight, where the weight of each load may be equal to its estimated energy consumption. Initializing the load values to their corresponding weights will have all loads with the same initial marginal value and thus maximize the energy consumed. However, regardless of the initial load values the system will converge to their true values over time.

In some embodiments, the total net load value may be normalized to a particular value, such as 100. In other embodiments, the normalization may be based on the smallest common denominator, so that all load values are the smallest possible integers.

The techniques described herein may be utilized for load control in a variety of systems, such as load control in a microgrid, smart grid, residential home, business office, and the like. In one or more embodiments, the techniques described herein are utilized for load control in a microgrid comprising a distributed generator (DG) having a plurality of microinverters coupled to a plurality of photovoltaic (PV) modules.

In various embodiments, the method 300 is an implementation of the relative load value module 210 described above. In some embodiments, a computer readable medium comprises a program that, when executed by a processor (such as the processor of controller 116 described above), performs the method 300.

The method 300 starts at step 302 and proceeds to step 304. At step 304 a determination is made whether an operating state change has occurred for any of the loads in the plurality of loads. If the result of the determination is no, i.e., there were no load state changes, the method 300 returns to step 304.

If the result of the determination at step 304 is yes, that a change to the operating state of a load has occurred, the method 300 proceeds to step 306. At step 306, a secondary knapsack is created where the weight limit of the secondary knapsack (which may be referred to as a secondary threshold) is based on the weight limit of the primary knapsack (which may be referred to as a primary threshold).

In those embodiments where the load state changed from OFF to ON, the weight limit for the secondary knapsack (i.e., the secondary threshold) is set equal to the weight limit of the primary knapsack (i.e., the primary threshold) less the weight of the load having changed state. For example, a particular load A may be OFF because, in the primary knapsack solution, that there was another load or combination of loads having a net value greater than or equal to load A, and a net weight less than or equal to load A. If the user overrides the system and turns the load A back ON (e.g., via a user interface), a secondary knapsack problem is created with the secondary knapsack weight limit being the primary knapsack weight limit less the weight of load A, since load A must now be ON in the solution. Given that the load A must be ON, the size of the secondary knapsack in now smaller than the primary knapsack, and that smaller secondary knapsack is to be resolved using the remaining loads (i.e., all loads in the plurality of loads other than load A).

In those embodiments where the load state changed from ON to OFF, the weight limit for the secondary knapsack is set equal to the weight limit of the primary knapsack. For example, a particular load B may be ON as a result of the primary solution, and the user overrides the system and turns the load B OFF (e.g., via a user interface). Since the load B must be OFF in the secondary solution, it takes up no space in the secondary knapsack and the secondary knapsack weight remains the same as the primary knapsack weight limit. The secondary knapsack problem is to be resolved using the remaining loads (i.e., all loads in the plurality of loads other than load B).

The method 300 proceeds to step 308 where the secondary knapsack is resolved to obtain the secondary solution, and the method 300 then proceeds to step 310.

At step 310, those loads changing operating state change in resolving the secondary knapsack are determined, and the values of those loads having state changes from ON to OFF and those loads having state changes from OFF to ON are separately summed. For example, in those embodiments where a user changed the operating state of a load from OFF to ON, in the resolution of the secondary knapsack one or more loads must turn OFF, and some loads may turn ON; if a relatively large load must turn OFF in the secondary solution, some smaller loads that were not ON in the primary solution may be able to be included.

For those loads having operating state changes from ON to OFF in the secondary knapsack resolution, their values are summed and may be represented by "X"; for those loads having operating state changes from OFF to ON in the secondary knapsack resolution, their values are summed and may be represented by "Y". The method 300 proceeds to step 312.

At step 312, a determination is made whether the change in load operating state determined in step 304 was from ON to OFF. If the result of the determination is yes, that the load operating state changed from ON to OFF, the method 300 proceeds to step 314.

At step 314, the new value (i.e., the updated value) for the load having the operating state change determined at step 304 (load B in the example above) is calculated as Y−X−t, where t is a tiebreaker value which, in some embodiments, may be set to 1. The calculation performed determines a decreased value for the load (load B in the example above) low enough that it would have been OFF in the primary knapsack solution. By turning the load OFF and thereby overriding the state of the load determined by the primary knapsack, the user indicates to the system that the value for load at that time was too high and should be redetermined such that the load would have been OFF. The load is assigned the updated value, and the method 300 proceeds from step 314 to optional step 318.

If, at step 312, the result of the determination is no, that the load operating state did not change from ON to OFF, and thus changed from OFF to ON, the method 300 proceeds to step 316.

At step 316, the new value (i.e., the updated value) for the load having the operating state change determined at step 304 (load A in the example above) is calculated as X−Y+t, where t is a tiebreaker value added as a tiebreaker to prevent multiple knapsack solutions having equal value. In some embodiments, t may be set to 1 although other values may be used. The calculation performed determines the minimum value for the load (load A in the example above) such that it would have been ON in the primary knapsack solution; by turning the load ON and thereby overriding the state of the load determined by the primary knapsack, the user indicates to the system that the value for load at that time was too low and should be redetermined such that the load would have been ON. The load is assigned the updated value, and the method 300 proceeds to optional step 318.

At optional step 318, the load values are re-normalized to total a fixed value, for example a value of 100, to address the change in the net value that results from the updated load value. In other embodiments, a different normalization may be used, such as normalization based on the smallest common denominator. In still other embodiments, there may be no normalization at all and the method proceeds from both steps 314 and 316 directly to step 320.

At step 320, a determination is made whether to continue. If the result of the determination is yes, the method 300 returns to step 304, and each time a load operating state is changed (e.g., by a user), the secondary knapsack technique is iteratively repeated to adaptively calculate new scores for the loads.

If, at step 320, the result of the determination is no, the method 300 proceeds to step 322 where it ends.

Although the techniques described above relate to a 0/1 knapsack problem for loads that are either ON or OFF, in other embodiments the described techniques may be utilized for other types of knapsack problems or other types of combinatory optimization problems. In some alternative embodiments, the system may perform time-series learning of load value schedules by tracking how the load values change and, over time, derive a value schedule for the loads.

While the foregoing is directed to embodiments of the present invention, other and further embodiments of the invention may be devised without departing from the basic scope thereof, and the scope thereof is determined by the claims that follow.

The invention claimed is:

1. A method for determining relative value of electrical loads controllable via a user interface of a controller, comprising:
   enabling the controller to learn in an intuitive manner the relative value of the electrical loads; and
   inferring the relative value of the loads based on user-provided feedback comprising ON/OFF user interactions received at the user interface such that when a user turns a load of the loads from OFF to ON, the controller determines that a value of the load at that time is too low, and when the user turns the load from ON to OFF, the controller determines that the value of the load at that time is too high,
   wherein (i) each load in the plurality has both a weight and a value associated with it and (ii) the plurality of loads is operating according to a primary solution of operating states where a net weight of all loads in the plurality of loads with an activated state satisfies a primary threshold, and wherein inferring comprises:
      determining a secondary solution of operating states for a subset of loads in the plurality of loads, the subset not including the load having the change in operating state, such that a net weight of all loads in the subset with an activated state satisfies a secondary threshold, the secondary threshold based on the primary threshold; and
      based on the relative value of loads in the subset that have operating states in the secondary solution different from their operating states in the primary solution, dynamically updating the relative values of the loads to derive a correct ON/OFF state of the load having the change in operating state.

2. The method of claim 1 wherein, when the change in operating state is from deactivated to activated, the secondary threshold is equal to the primary threshold less the weight of the load having the change in operating state.

3. The method of claim 2, wherein the updated value is equal to X-Y+t, where X=the sum of the values of loads in the subset having activated states in the primary solution and deactivated states in the secondary solution; Y=the sum of the values of loads in the subset having deactivated states in the primary solution and activated states in the secondary solution; and t=a tiebreaker value.

4. The method of claim 1 wherein, when the change in operating state is from activated to deactivated, the secondary threshold is equal to the primary threshold.

5. The method of claim 4, wherein the updated value is equal to Y-X-t, where X=the sum of the values of loads in the subset having activated states in the primary solution and deactivated states in the secondary solution; Y=the sum of the values of loads in the subset having deactivated states in the primary solution and activated states in the secondary solution; and t=a tiebreaker value.

6. The method of claim 1, further comprising updating the value of the load having the change in operating state iteratively so that over time the updated value of the load converges to a true value of the load.

7. The method of claim 1, further comprising re-normalizing the load values for the plurality of loads to a total fixed value.

8. An apparatus for determining relative value of electrical loads controllable via a user interface of a controller, comprising:
a controller, comprising at least one processor for enabling the controller to learn in an intuitive manner the relative value of the electrical loads; and
inferring the relative value of the loads based on user-provided feedback comprising ON/OFF user interactions received at the user interface such that when a user turns a load of the loads from OFF to ON, the controller determines that a value of the load at that time is too low, and when the user turns the load from ON to OFF, the controller determines that the value of the load at that time is too high,
wherein (i) each load in the plurality of loads has both a weight and a value associated with it and (ii) the plurality of loads is operating according to a primary solution of operating states where a net weight of all loads in the plurality of loads with an activated state satisfies a primary threshold, and wherein inferring comprises:
determining a secondary solution of operating states for a subset of loads in the plurality of loads, the subset not including the load having the change in operating state, such that a net weight of all loads in the subset with an activated state satisfies a secondary threshold, the secondary threshold based on the primary threshold; and
, based on the relative value of loads in the subset that have operating states in the secondary solution different from their operating states in the primary solution, dynamically updating the relative values of the loads to derive a correct ON/OFF state of the load having the change in operating state.

9. The apparatus of claim 8 wherein, when the change in operating state is from deactivated to activated, the secondary threshold is equal to the primary threshold less the weight of the load having the change in operating state.

10. The apparatus of claim 9, wherein the updated value is equal to X-Y+t, where X=the sum of the values of loads in the subset having activated states in the primary solution and deactivated states in the secondary solution; Y=the sum of the values of loads in the subset having deactivated states in the primary solution and activated states in the secondary solution; and t=a tiebreaker value.

11. The apparatus of claim 8 wherein, when the change in operating state is from activated to deactivated, the secondary threshold is equal to the primary threshold.

12. The apparatus of claim 11, wherein the updated value is equal to Y-X-t, where X=the sum of the values of loads in the subset having activated states in the primary solution and deactivated states in the secondary solution; Y=the sum of the values of loads in the subset having deactivated states in the primary solution and activated states in the secondary solution; and t=a tiebreaker value.

13. The apparatus of claim 8, wherein controller is further enabled for updating the value of the load having the change in operating state iteratively so that over time the updated value of the load converges to a true value of the load.

14. The apparatus of claim 8, wherein the controller further re-normalizes the load values for the plurality of loads to a total fixed value.

15. A non-transitory computer readable medium comprising a program that, when executed by a processor, performs a method for determining relative value of electrical loads controllable via a user interface of a controller, the method comprising:
enabling the controller to learn in an intuitive manner the relative value of the electrical loads;
inferring the relative value of the loads based on user-provided feedback comprising ON/OFF user interactions received at the user interface comprising: such that when a user turns a load of the loads from OFF to ON, the controller determines that a value of the load at that time is too low, and when the user turns the load from ON to OFF, the controller determines that the value of the load at that time is too high,
wherein (i) each load in the plurality has both a weight and a value associated with it and (ii) the plurality of loads is operating according to a primary solution of operating states where a net weight of all loads in the plurality of loads with an activated state satisfies a primary threshold, and wherein inferring comprises:
determining a secondary solution of operating states for a subset of loads in the plurality of loads, the subset not including the load having the change in operating state, such that a net weight of all loads in the subset with an activated state satisfies a secondary threshold, the secondary threshold based on the primary threshold; and
based on the relative value of loads in the subset that have operating states in the secondary solution different from their operating states in the primary solution, dynamically updating the relative values of the loads to derive a correct ON/OFF state of the load having the change in operating state.

16. The non-transitory computer readable medium of claim 15, wherein, when the change in operating state is from deactivated to activated, the secondary threshold is equal to the primary threshold less the weight of the load having the change in operating state.

17. The non-transitory computer readable medium of claim 16, wherein the updated value is equal to X-Y+t, where X=the sum of the values of loads in the subset having activated states in the primary solution and deactivated states in the secondary solution; Y=the sum of the values of loads in the subset having deactivated states in the primary solution and activated states in the secondary solution; and t=a tiebreaker value.

18. The non-transitory computer readable medium of claim 15 wherein, when the change in operating state is from activated to deactivated, the secondary threshold is equal to the primary threshold.

19. The non-transitory computer readable medium of claim 18, wherein the updated value is equal to $Y-X-t$, where X=the sum of the values of loads in the subset having activated states in the primary solution and deactivated states in the secondary solution; Y=the sum of the values of loads in the subset having deactivated states in the primary solution and activated states in the secondary solution; and t=a tiebreaker value.

20. The non-transitory computer readable medium of claim 15, further comprising updating the value of the load having the change in operating state iteratively so that over time the updated value of the load converges to a true value of the load.

* * * * *